US008024296B1

(12) United States Patent
Gopinathan et al.

(10) Patent No.: US 8,024,296 B1
(45) Date of Patent: Sep. 20, 2011

(54) METHOD AND APPARATUS FOR AGENT-LESS AUDITING OF SERVER

(75) Inventors: Madhu Gopinathan, Ponda-Goa (IN); Pushkar Raj Tiwari, Hoshangabad (IN)

(73) Assignee: Symantec Corporation, Mountain View, CA (US)

( * ) Notice: Subject to any disclaimer, the term of this patent is extended or adjusted under 35 U.S.C. 154(b) by 188 days.

(21) Appl. No.: 11/818,671

(22) Filed: Jun. 15, 2007

(51) Int. Cl.
*G06F 17/30* (2006.01)

(52) U.S. Cl. ......... 707/648; 713/164; 713/177; 707/954

(58) Field of Classification Search .................... 707/10, 707/204, 201, 202, 648, 954; 718/103; 713/177, 713/164; 726/1, 22, 23, 25, 26
See application file for complete search history.

(56) References Cited

U.S. PATENT DOCUMENTS

| 5,414,845 | A | * | 5/1995 | Behm et al. ................ 718/104 |
| 5,860,069 | A | * | 1/1999 | Wright ........................... 1/1 |
| 5,926,813 | A | * | 7/1999 | Chaudhuri et al. ................ 1/1 |
| 5,978,475 | A | * | 11/1999 | Schneier et al. ............. 713/177 |
| 6,182,079 | B1 | * | 1/2001 | Lenzie ............................. 1/1 |
| 6,640,223 | B1 | * | 10/2003 | Jones et al. .................... 707/3 |
| 7,483,898 | B2 | * | 1/2009 | Abdo et al. ................... 707/10 |
| 7,603,340 | B2 | * | 10/2009 | Ngai et al. ....................... 1/1 |
| 7,640,245 | B1 | * | 12/2009 | Abdo et al. ....................... 1/1 |
| 7,730,068 | B2 | * | 6/2010 | Sarnowicz et al. ........... 707/738 |
| 7,831,693 | B2 | * | 11/2010 | Lai ............................. 709/220 |
| 7,832,008 | B1 | * | 11/2010 | Kraemer ........................ 726/22 |
| 2005/0086242 | A1 | * | 4/2005 | Ngai et al. .................... 707/100 |
| 2005/0086246 | A1 | * | 4/2005 | Wood et al. .................. 707/101 |
| 2005/0262060 | A1 | * | 11/2005 | Rohwedder et al. ............. 707/3 |
| 2006/0036574 | A1 | * | 2/2006 | Schweigkoffer et al. ......... 707/2 |

* cited by examiner

*Primary Examiner* — Jean M Corrielus
(74) *Attorney, Agent, or Firm* — Campbell Stephenson LLP

(57) ABSTRACT

A method and apparatus for agent-less auditing of a server, wherein the apparatus processes data for auditing a server. One or more portions of audit information (e.g., transaction log, trace log, or both) are coupled from a target server to an information server. The one or more portions of the audit information are processed at the information server to create audit data. The audit data is stored in an audit data repository.

20 Claims, 5 Drawing Sheets

METHOD AND APPARATUS FOR AGENT-LESS AUDITING OF SERVER

BACKGROUND OF THE INVENTION

1. Field of the Invention

Embodiments of the present invention generally relate to auditing events occurring upon a server. More particularly, the present invention relates to a method and apparatus for creating and processing audit data from events within a target server, without using an agent that resides on the target server.

2. Description of the Related Art

A software agent is a piece of computer code (e.g., C++, Java, etc.) that acts on behalf of a user and/or another computer program in an agency relationship. The software agent may comprise functions, methods, and objects. For the most part, the software agent is defined by its behavior.

A software agent is generally capable of operating autonomously. Usually, software agents run in the background of a system (e.g., operating system, control system, etc.) to analyze their computer environment and react accordingly. Software agents communicate with other system components in order to coordinate activities or collaborate on a given task. In one particular use of an agent, the agent is placed upon a server to audit server activity by gathering server events and transaction information. The agent communicates this information to a monitoring server that analyzes the information to understand the operation of the server as well as other servers in a network.

Since agents are executable programs, they create a processing burden for the server on which they are executed. Furthermore, software agents require constant monitoring and maintenance by well-trained, qualified professionals (e.g., database administrators, software engineers, and system specialists). Thus, the use of agents creates an administrative burden as well as a processing burden.

Therefore, there is a need for a method and apparatus for performing agent-less auditing of a server.

SUMMARY OF THE INVENTION

Embodiments of the invention include a method and apparatus for agent-less auditing of a server is described. In one embodiment of the invention, the method and apparatus processes data for auditing a server. One or more portions of audit information (e.g., transaction log, trace log, or both) are coupled from a target server to an information server. The one or more portions of the audit information are processed at the information server to create audit data. The audit data is stored in an audit data repository.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of the drawings or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the "may" is used in a permissive sense (i.e., meaning must). Similarly, the words "include", "including", and "includes", mean including but not limited to.

DETAILED DESCRIPTION

Embodiments of the present invention include a method and apparatus for auditing a target server without using an agent. The apparatus is embodied in a system comprises an information server that accesses certain audit information such as event traces and transaction logs of a target server. The information server processes the audit information to create audit data that represents the operation of the target server and facilitates auditing functions.

Figure 1:
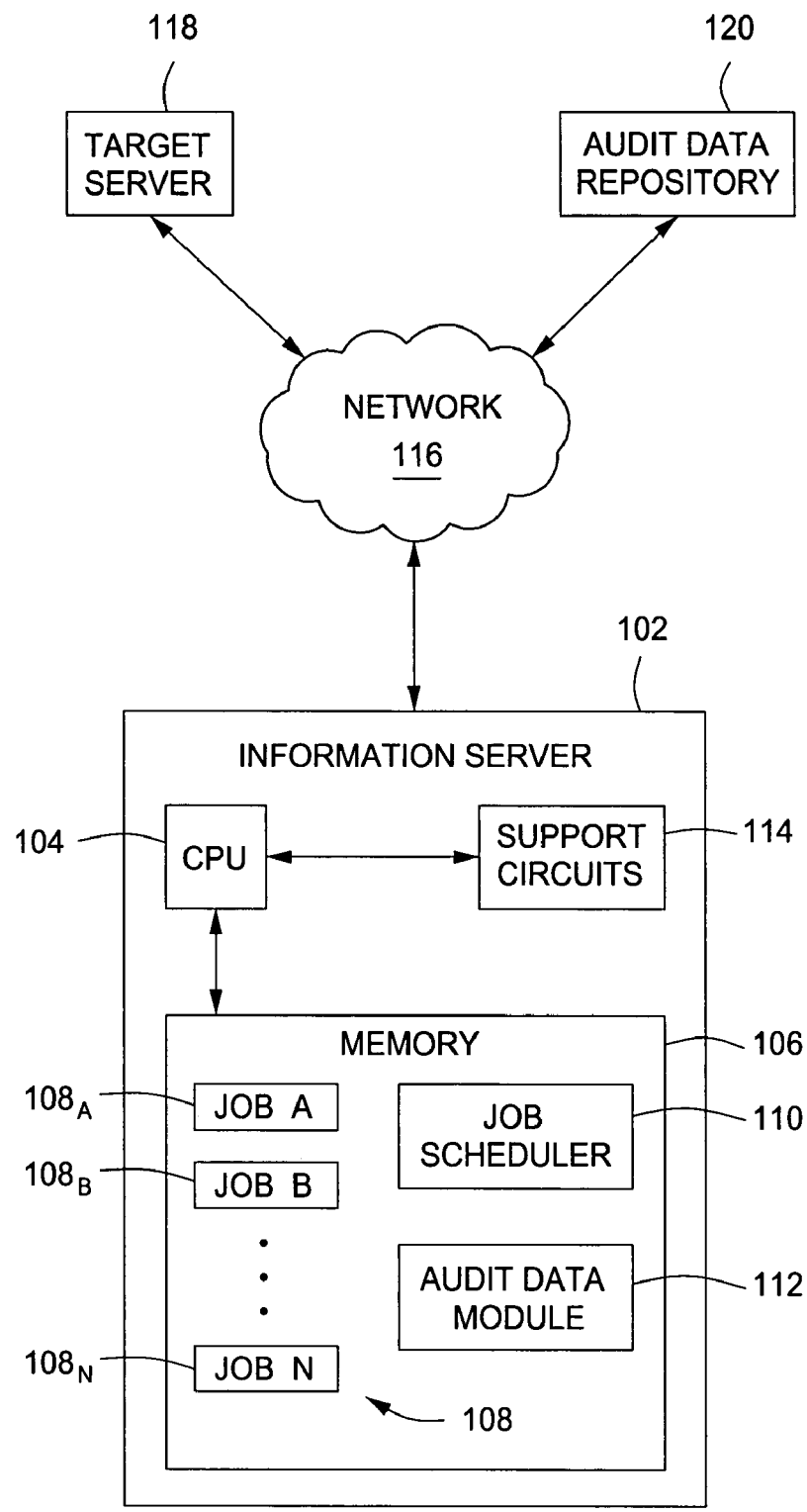
FIG. 1 is a block diagram of a networked computer system for agent-less auditing of a server, according to an exemplary embodiment of the present invention.

FIG. 1 is a block diagram depicting an exemplary embodiment of a networked computer system 100 that is structured and/or operated in accordance with one or more embodiments of the invention. In one embodiment, the system 100 includes an information server 102, at least one target server 118 (one of which is shown), and an audit data repository 120, each coupled to a network 116. The network 116 comprises a communication system that connects computer system by wire, cable, fiber optic, and/or wireless links facilitated by various types of well-known network elements, such as hubs, switches, routers, and the like. The network 116 may employ various well-known protocols to communicate information amongst the network resources. For example, the network 116 may be part of the Internet. The information server 102 may be an integrated software platform that enables organizations to integrate data from disparate sources and deliver trusted and complete information throughout the networked computer system 100.

The target server 118 may be a computer, an application, network resource and the like that provides data and/or services in an information system (e.g., a database management system such as an SQL database server). The target server 118 is also a source of data for the information server 102, which is adapted to audit the operation of the target server in accordance with various embodiments of the invention. The audit data repository 120 is data storage structure, which may store audit data related to the target server 118.

The information server 102 illustratively includes a central processing unit (CPU) 104, a memory 106, a job scheduler 110, an audit data module 112, and various support circuits 114. The CPU 104 may include one or more microprocessors known in the art. The job scheduler 110 is an application that controls background executions of tasks (e.g. jobs) within the networked computer system 100. The support circuits 114 for the CPU 104 may include conventional cache, power supplies, clock circuits, data registers, I/O interfaces, and the like.

The memory 106 stores processor-executable instructions and/or data that may be executed and/or used by the CPU 104. The memory 106 may include one or more of the following: random access memory, read only memory, magneto-resistive read/write memory, optical read/write memory, cache memory, magnetic read/write memory, and the like. The processor-executable instructions may comprise hardware, firmware, software, and the like, or some combination thereof. These processor-executable instructions may comprise jobs 108A-N, the job scheduler 110, an audit data module 112. A job performs one or more actions in a single operation. Numerous actions may be defined such as querying a database retrieving data, backing up data, performing database administration tasks, running executables, and/or communications through a network. The job scheduler 110 executes jobs in accordance with a particular schedule. For example, a given job may be executed hourly, daily, weekly, monthly, or over like type execution cycles. The audit data module 112 processes information collected from the target server and creates audit data, as discussed below.

In one embodiment, the audit data module 112 and the job scheduler 110 cooperate to create audit data related to the target server 118 without using an agent. The job scheduler 110 executes jobs 108*a-n* (collectively referred to as jobs 108) to couple the information server 102 to one or more portions of audit information within the target server 118 (explained further below). The audit data module 112 processes the one or more portions of audit information to create audit data (explained further below). The information server 102 stores the audit data on the audit data repository 120 where the audit data can be accessed and processed to facilitate an understanding of network operation subsequently.

Figure 2:
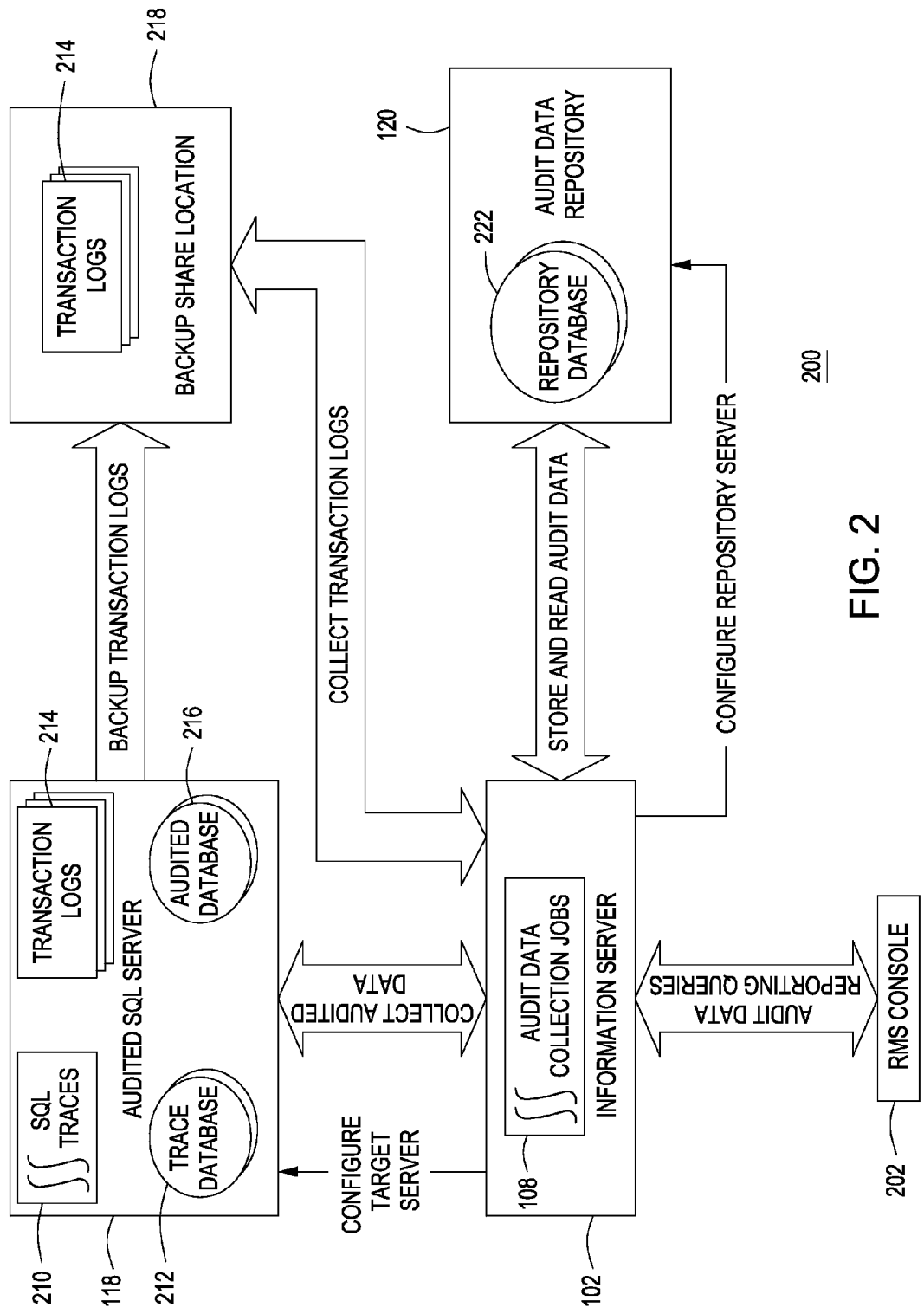
FIG. 2 is a functional block diagram of the networked computer system of FIG. 1.

FIG. 2 is a functional block diagram depicting an exemplary embodiment of a Risk Management System (RMS) 200 (referred to herein as the system 200) in accordance with one or more embodiments of the invention. In one embodiment, the system 200 includes a Risk Management System (RMS) console 202, an information server 102, a target server 118, a backup share location 218, and an audit data repository 120. The RMS console 202 performs administrative tasks (e.g., adding/removing servers, configuring servers, setting permissions, and the like) and executes queries on audit data. The RMS console 202 may be an input/output interface of the information server 102.

The information server 102 performs job processing and data storage as configured by the RMS console 202 and/or other RMS components of the system 200. One example of an information server is a BindView information server that is available from Symantec Corporation of Cupertino, Calif. In one embodiment of the invention, the target server 118 is a computer running an instance of an SQL server application. The target server activities are configurable for auditing by the RMS console 202, i.e., one or more portions of the audit information such as transaction logs and/or trace logs are made available to the information server 102. For example, the transaction logs may be accessed either within the server 118 or as backup data within the backup share location 218. The backup share location stores and/or provides backup of auditable data of target server 118. The audit data repository 120 stores and/or provides audit data related to the target server 118.

The Information server 102 further includes audit data collection jobs 108 (e.g., jobs 108*a-n* of FIG. 1). In the present example, audit data collection jobs 108 obtain server audit information from the target server 118. The audit data collections jobs 108 may be queries of a hidden data source of server audit information located on the target server 118 or in the backup share location 218.

In one embodiment of the invention, the target server 118 is a SQL server that illustratively includes SQL traces 210, a trace database 212, an audited database 216, and transaction logs 214. The SQL traces 210 (i.e., a sequence of events that are stored in trace logs) comprise event information related to operation of the SQL server. The trace database 212 stores the trace logs. The audited database 216 contains data tables and stored procedures configured for auditing. The transaction logs 214 keep track of each and every operation performed on the audited database 216. Backup copies of the transaction logs 214 may be communicated to the backup share location 218 for storage.

The audit data repository 120 includes a repository database 222. The repository database 222 stores audit data relating to target servers within the system 200.

In one embodiment, the audit data collection jobs 108 cooperates with audit data module 112 to process audit information for auditing events (e.g., server level events, database level events, object level events, etc.) of the target server 118 and/or the audited database. RMS console 202 sends a query which prompts the information server 102 to access the server audit information (e.g., the transaction logs 214 and/or the SQL traces 210) within the target server 118. First, the RMS console configures the audited SQL server 118 and/or the audited database 216 for auditing through the information server 102, i.e., the SQL server 118 is configured to allow the information server 102 to access the necessary audit information within the target server 118.

For example, when a new SQL server 118 is added for auditing, a database (Trace Database 212) meant to store the auditing data collected for the instance, as well as configuration information which will help filter the audited events, is created on the SQL Server 118. Status information regarding the health of auditing being performed on that target server 118 is also stored within this database.

The size of the trace database 212 can be limited while configuring the SQL Server 118 for auditing. The administrator also has an option of letting the trace database 212 grow infinitely. Limiting the trace database size to a certain size helps mitigate risks of bloating the database if the audit data within the trace database 212 was not successfully collected into the configured repository due to some reason. A cleanup job on the target SQL Server 118 cleans up the trace database 212 whenever it exceeds the maximum size limit.

Auditing activities occurring on the SQL Server 118 involve starting up a SQL trace 210 which runs in the background capturing events that have been filtered. The SQL trace 210 is filtered to capture only those events that have been configured as a part of the auditing configuration for the SQL Server 118. The SQL trace 210 then collects the trace events into the trace database 212.

There are essentially two levels of events, i.e. Server Level Events (i.e., events having their scope to the entire SQL Server instance) and Database Level Events (i.e., events having their scope within a particular database within the SQL Server Instance). As a result, Server Level Events are configured when the SQL Server instance is configured for auditing, while the Database Level Events for a database are configured when that database is configured for auditing.

As the target server 118 is being configured, the RMS console 202 sends a query for audit data to the information server 204. There is one collection job 108 created per Audited Server and per Audited SQL Server database. Thus, when a SQL Server instance is configured for auditing, a scheduled job is create to retrieve audit information for the audited server. When a database in the audited SQL Server is added for auditing, another scheduled task is created for collecting audit data for events occurring on configured tables and stored procedures in the database. In accordance with the job execution schedule, the information server 102 initiates and executes one or more audit data collection jobs 108 to collect one or more portions of the audit information, which is associated with the events that are configured for auditing. Alternatively, some or all of the audit information may be collected from the backup share location 218, which stores backup copies of, for example, the transaction logs 214.

Audit data is created after the information server 102 processes the data from the audit information. The audit data may be a combination of the transaction logs and login/logout events obtained from the SQL traces pertaining to the audited SQL server 118 and/or the audited database 216. The audit data may also comprise an audited SQL server 118 login, a time data of the target server 118 login, and a process ID associated with the audited SQL server 118 login. The audit data may also be one or more portions of a database table of the audited SQL server 118 and/or the audited database 216. The information server 204 stores the audit data in the repository database 222 of the audit data repository 120.

Figure 3:
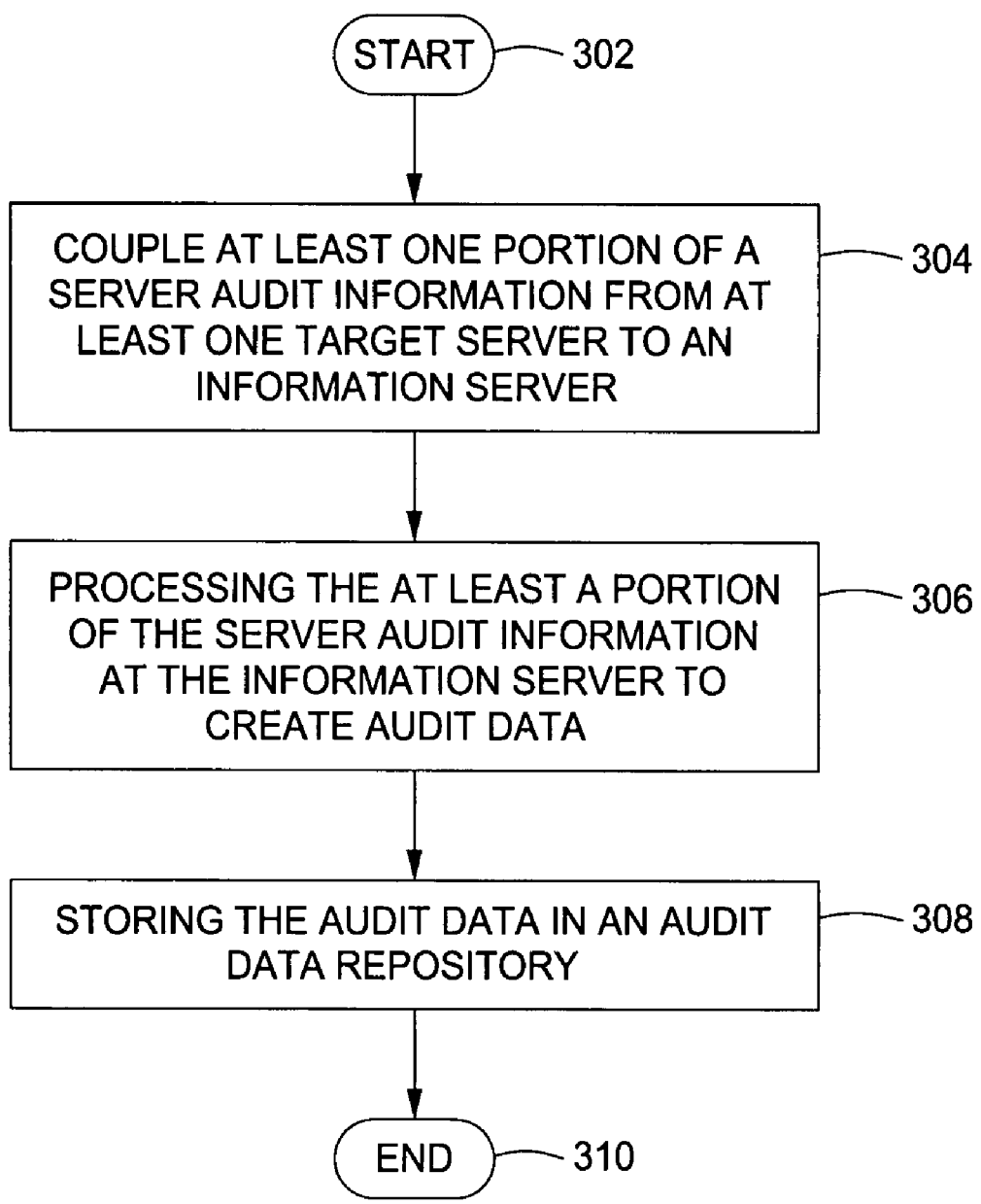
FIG. 3 is a flow chart of a method for processing data to audit a server without an agent according to an exemplary embodiment of the present invention.

FIG. 3 is a flow chart of a method 300 for processing data to audit a server without an agent according to an exemplary embodiment of the present invention. The method 300 begins at step 302. In one embodiment, at least one target server is configured for auditing events such as server-level events, database-level events, and object-level events.

At step 304, one or more portions of audit information from at least one target server are coupled to an information server. Step 304 represents a collection phase of the method 300. The server audit information may comprise at least one of a transaction log or a trace. A job may be scheduled to perform this information collection phase wherein the trace data is bulk copied from the target server to the audit data repository and subsequently processed in a processing phase. Alternately, the transaction logs are processed for server audit information using either an Online transaction Log Reader or a Backup Transaction Log Reader, depending upon the type of log that is being used for audit purposes. The readers may comprise filters to limit the number of log records that are processed on the information server at any given point of time.

The transaction logs represent any update that has been made to any table in a SQL database. Updates to a table include Insert/Update/Delete of rows as well other maintenance activities including formation of indexes, allocation/deallocation of data pages for the table, and transaction markers (markers signaling the boundaries of a transaction). All committed operations are bounded by the BEGIN_XACT (Begin Transaction) and COMMIT_XACT (Commit Transaction) log records. If a transaction is not committed, the changes are not reflected onto the table. Or rather, all changes are compensated with reversing records. For example, if a new row is added to a table but the transaction has not been committed, then a compensation record deleting the row is recorded to undo the log record signaling a new row being added. Transaction logs for row inserts and deletes include the entire row that was inserted or deleted as a part of the log record. Row updates record: offset within the row where the updates occurred and a series of bytes indicating the old values and the new values in the binary row.

Since the row inserted or deleted is actually a part of the log record, no extra lookups are required to construct the values of each column within the row. In the case of a row update however, the binary row (on which the update was performed) has to be fetched from the data page and then the transaction needs to be applied in a reverse manner to generate the previous state of the binary row. Once the previous state of the row has been generated, the column values in the old row and the new row can be computed.

Since the method 300 needs to fetch the rows from the SQL data pages into a rows cache for auditing row updates, the method 300 processes the transaction logs in the reverse order since the latest transaction log indicates the current state of a row.

The algorithm that executes in response to a data collection job is as follows:

Fetch and cache transaction logs relevant to the current table that have occurred since the last time a collection occurred for the current table Fetch and cache all rows from the SQL data page that have been updated For each transaction log in the cache (in the reverse)

If current log record is a DELETE, then interpret the column values and insert the binary row into the rows cache.

If current log record is an INSERT, then interpret the column values and delete the binary row from the rows cache.

If current log record is an UPDATE, then fetch the corresponding binary row from the rows cache, apply the transaction and generate the old state of the row. Interpret the column values and insert the "old" row into the cache Once the column values for each log record have been interpreted, the values are bulk inserted into the Audit Data Repository configured for the Audited SQL Server that the database belongs to.

Save the details of the last processed log record so that the processing can occur for the next log record next time the collection occurs At step 306, a process phase is initiated, wherein the audit information is processed at the information server in order to create audit data for storage in the audit data repository. As discussed with respect to FIGS. 4 and 5 below, the audit data may comprise a combination of the transaction log and trace data. At step 308, audit data is stored in an audit data repository. The method 300 ends at step 310.

Figure 4:
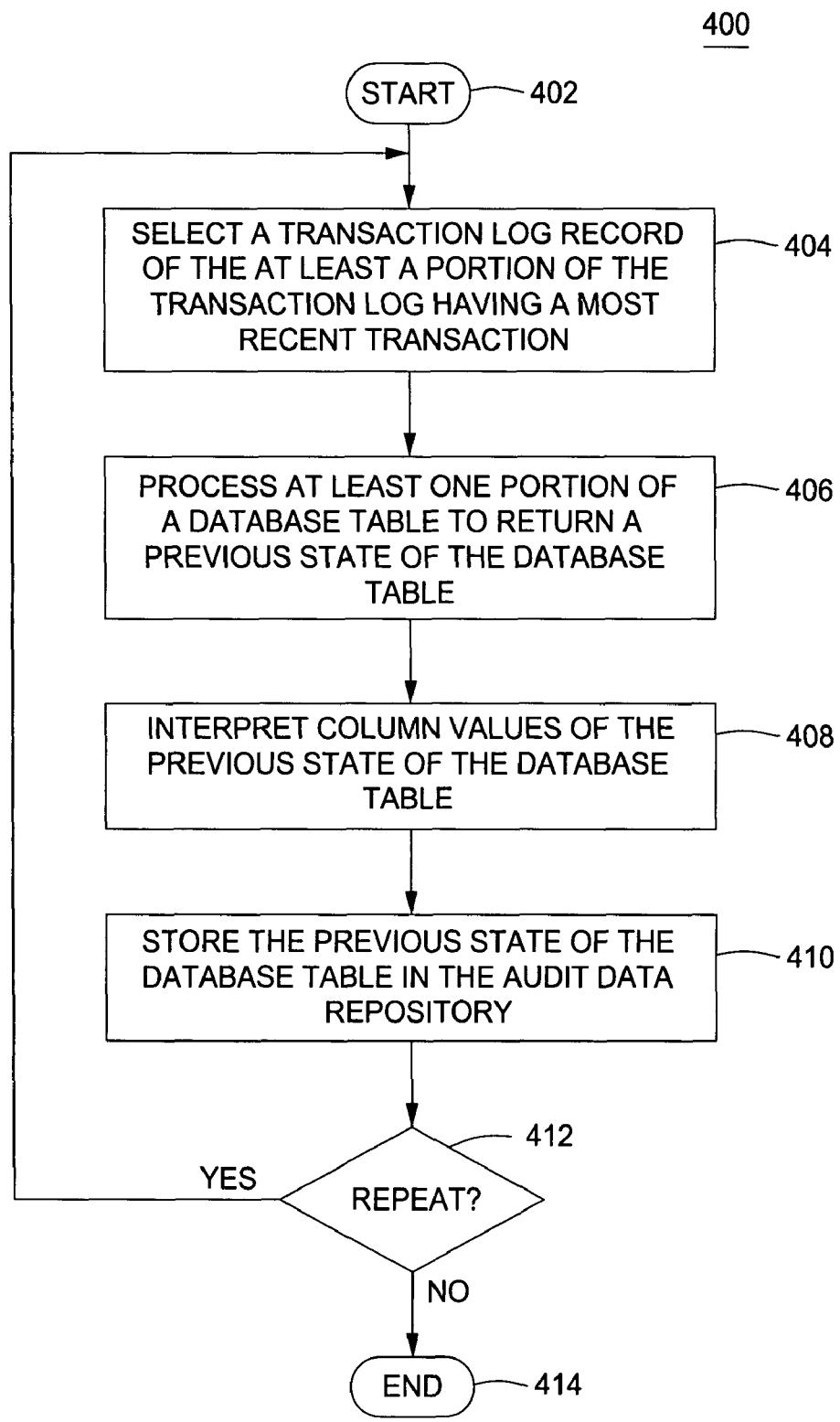
FIG. 4 is a flow chart of a method for processing the transaction log, according to an exemplary embodiment of the present invention.

FIG. 4 is a flow chart of a method 400 for processing the transaction log, according to an exemplary embodiment of the present invention. The method 400 begins at step 402 and proceeds to step 404 wherein, a transaction log record of one or more portions of the transaction log having a most recent transaction is selected. At step 406, one or more portions of a database table are processed in order to return a previous state of the database table. At step 408, column values of the previous state of the database table are interpreted as discussed below with respect to FIG. 5.

At step 410, the previous state of the database table is stored in the audit data repository. At step 412, a determination is made whether the method 400 should be repeated to process additional records. If the method 400 should be repeated, the method 400 returns to step 402. If the method 400 should not be repeated, the method 400 proceeds to step 414. The method ends at step 414. In one embodiment, the method 400 is repeated for each and every transaction log record in the one or more portions of the transaction log in reverse order of completion.

Figure 5:
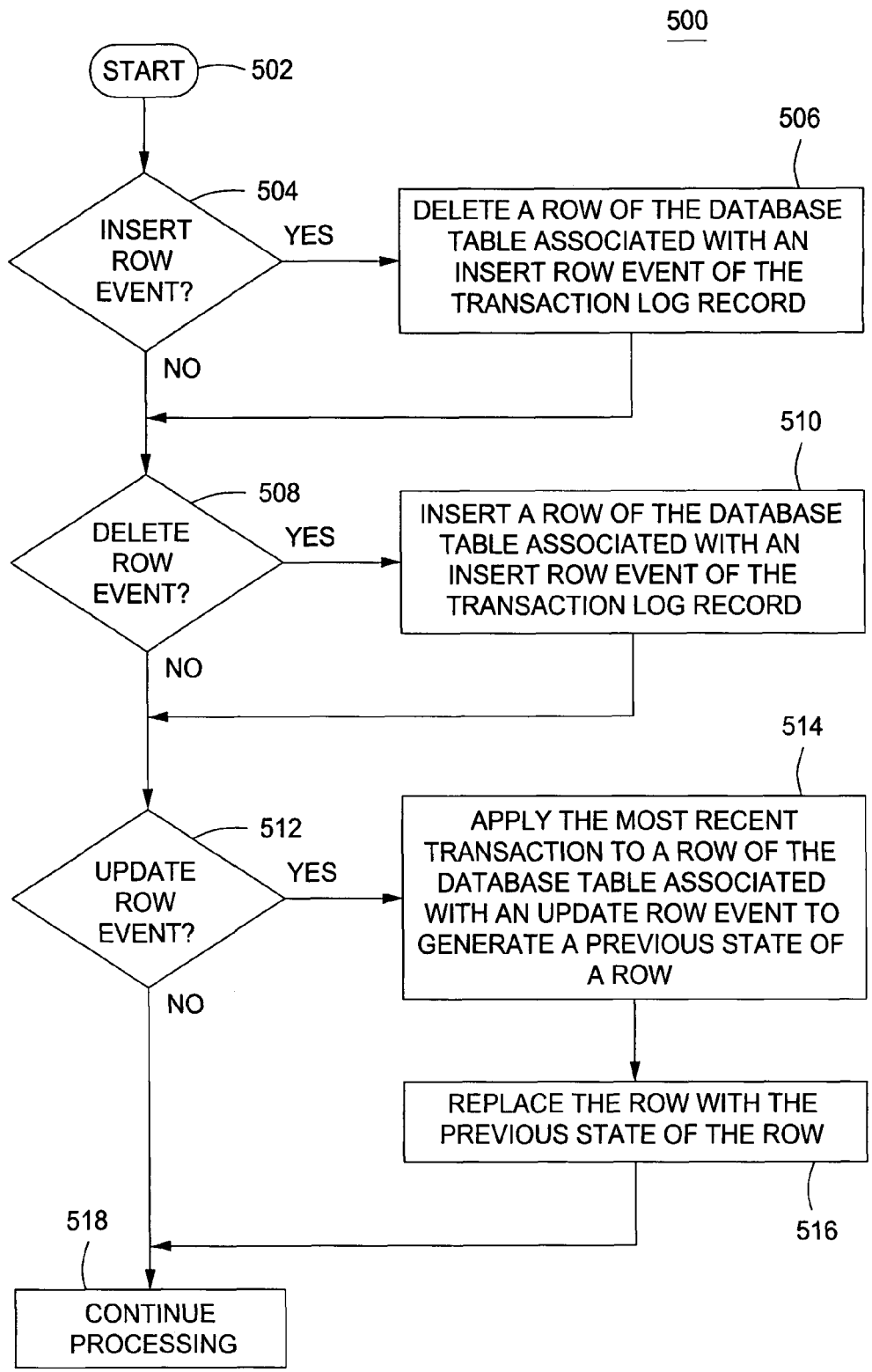
FIG. 5 is a flow chart of a method for returning a previous state of a database table, according to an exemplary embodiment of the present invention.

FIG. 5 is a flow chart of a method for returning a previous state of a database table, according to an exemplary embodiment of the present invention. The method 500 begins at step 502 and proceeds to step 504 wherein a determination is made whether the transaction log record includes an insert row event. If the transaction log record includes an insert row event, the method 500 proceeds to step 506. At step 506, a row from the rows cache of the database table associated with the insert row event of the transaction of the transaction log record is deleted. If the transaction log record does not include an insert row event, the method 500 proceeds to step 508.

At step 508, a determination is made whether the transaction log record includes a delete row event. If the transaction log record includes a delete row event, the method 500 proceeds to step 510. At step 510, a row of the database table associated with the delete row event of the transaction of the transaction log record is inserted into the rows cache. If the transaction log record does not include a delete row event, the method 500 proceeds to step 512.

At step 512, a determination is made whether the transaction log record includes an update row event. If the transaction log record includes an update row event, the method 500 proceeds to step 514. At step 514, the most recent transaction is applied to a row from the rows cache associated with an update row event to generate a previous state of a row. At step 516, the row in the rows cache is replaced with the previous state of the row. If the transaction log record does not include an update row event, the method 500 proceeds to step 518. At step 518, the processing of the database table is continued. Hence, each transaction log record that is collected is processed serially and the intermediate states of the table are generated thus serving all the information required for auditing including actual values involved in the transition from state to state.

Using scheduled jobs that are created on an information server instead of software agents residing on a target server to audit SQL server activities of a target server (e.g., SQL server level events, database-level events, object-level events, and other classes of events) facilitates collection and processing of the audit data without the complications associated with a software agent. The server audit information (e.g., transaction logs, trace based data, and a combination thereof), which contains data pertaining to various characteristics of each event configured for auditing, is stored in the audit data repository for future auditing of the target server. Furthermore, processed transaction logs, which when combined with trace based data, provide complete auditing of the DML (data manipulation language) events on a database table.

According to one embodiment, the infrastructure of the present invention is built upon target servers that provide sources of data and credentials that govern access privileges to the target servers. Since each user of the infrastructure may only have a Win32 process with a 2 GB set size to collect server audit information from target servers, the single Win32 process may be overwhelmed if the information exceeds a certain threshold. Because credentials are assignable on a user-by-user basis, different users with different credentials may be collecting information from the same target server. The auditing functionality of an embodiment of the present invention achieves agent-less capabilities by performing all the computations in separate processes independent of each other while not being restricted by the 2 GB process limit.

The audit data repository thus stores the audit data and provides the audit data to other components of the system for easy reporting. In fact, reporting on the audit data merely requires fetching audit data from the audit data repository.

While the foregoing is directed to embodiments of the present invention, other and further embodiments of the invention may be devised without departing from the basic scope thereof, and the scope thereof is determined by the claims that follow.

What is claimed is:

1. A method for processing data used to audit a server, comprising:
   coupling at least a portion of server audit information from a target server to an information server, wherein
      the target server comprises a database table,
      the server audit information comprises of a transaction log generated by the target server and a trace generated by the target server,
      the transaction log comprises information representing one or more operations to at least a portion of the database table, and
      the trace comprises information representing a login event related to the target server;
   processing the at least a portion of the server audit information at the information server to create audit data, wherein
      the processing the at least a portion of the server audit information comprises:
         using the transaction log and the at least a portion of the database table to generate at least one previous state of the at least a portion of the database table, and
      the audit data comprises:
         the at least one previous state of the at least a portion of the database table; and
         the login event; and
   storing the audit data in an audit data repository.

2. The method of claim 1, further comprising:
   scheduling a job to perform the act of coupling at least a portion of the server audit information from the target server to an information server.

3. The method of claim 1, wherein
   the act of coupling further comprises configuring, within the target server, at least one of a server event, a database event, or an object level event for auditing.

4. The method of claim 1, wherein
   the login event comprises a number of login/logout events.

5. The method of claim 1, wherein
   the login event comprises a SQL server login, a time data of the SQL server login, and a process ID associated with the SQL server login.

6. The method of claim 1, wherein the using the transaction log and the at least a portion of the server audit information further comprises:
   selecting a transaction log record from the transaction log;
   based on an operation corresponding to the transaction log record, processing at least one portion of a database table to return a previous state of the database table;
   interpreting column values of the previous state of the database table; and
   storing the previous state of the database table corresponding to the transaction log record in the audit data repository.

7. The method of claim 6, further comprising:
   repeating, for each transaction log record in the transaction log, the acts of selecting a most recent transaction log record that has not yet been selected;

based on an operation corresponding to the most recent transaction log record, processing the at least one portion of the database table to return the previous state of the database table;

interpreting column values; and storing the previous state of the database table corresponding to the most recent transaction log record.

8. The method of claim 6, wherein the processing the at least one portion of the database table to return the previous state of the database table further comprises, for each transaction log record in the transaction log:

deleting a row from the rows cache if the operation corresponding to the each transaction log record includes an insert row event;

inserting a row into the rows cache if the operation corresponding to the each transaction log record includes a delete row event; or applying the most recent transaction to a row of the database table to return a previous state of the row and replacing the row of the database table with the previous state of the row in the rows cache if the operation corresponding to the each transaction log record includes an update row event.

9. The method of claim 1, wherein the coupling, processing and storing acts are performed with respect to individual users having independent credentials, whereby separate and independent audit data is stored for different users.

10. The method of claim 1, wherein the transaction log further comprises a plurality of log records that represent the one or more updates to the at least a portion of the database table, and the using the transaction log to generate a previous state of the at least a portion of the database table comprises processing, in reverse, at least a subset of the plurality of the log records of the transaction log.

11. An apparatus for processing data used to audit a server, comprising:

a target server configured to access a database table and audit information, wherein the audit information comprises a transaction log generated by the target server a trace generated by the target server, the transaction log comprises information representing one or more operations to at least a portion of the database table, and the trace comprises information representing a login event related to the target server;

an information server for collecting and processing the audit information, wherein the information server comprises a processor, the information server is adapted for accessing the audit information through a network and processing the audit information to create audit data, the information server is configured to process the audit information using the transaction log and the at least a portion of the database table to generate at least one previous state of the at least a portion of the database table, and the audit data comprises:

the at least one previous state of the at least a portion of the database table; and the login event;

an audit data repository for storing the audit data.

12. The apparatus of claim 11, wherein the information server is operable to configure, within the target server, at least one of a server event, a database event, or an object level event for auditing.

13. The apparatus of claim 11, wherein the login event comprises a number of login/logout events.

14. The apparatus of claim 11, wherein the login event comprises a SQL server login, a time data of the SQL server login, and a process ID associated with the SQL server login.

15. The apparatus of claim 11, wherein the audit data further comprises at least the portion of a database table.

16. The apparatus of claim 11 further comprising:

means for selecting a transaction log record;

means for processing, based on an operation corresponding to the transaction log record, at least one portion of a database table to return a previous state of the database table;

means for interpreting column values of the previous state of the database table; and means for storing the previous state of the database table in the audit data repository.

17. The apparatus of claim 16, further comprising:

means for repeating the acts of:

selecting a most recent transaction log record that has not yet been selected;

based on an operation corresponding to the most recent transaction log record, processing the at least one portion of the database table to return the previous state of the database table;

interpreting column values; and storing the previous state of the database table corresponding to the most recent transaction log record.

18. The apparatus of claim 17, wherein the means for processing the at least one portion of the database table to return the previous state of the database table further comprises, for each transaction log record in the transaction means for deleting a row of the database table if the operation corresponding to the each transaction log record includes an insert row event;

means for inserting a row of the database table if the operation corresponding to the each transaction log record includes a delete row event; or means for applying the most recent transaction to a row of the database table to return a previous state of the row and replacing the row of the database table with the previous state of the row if the operation corresponding to the each transaction log record includes an update row event.

19. A system for processing data used to audit a server, comprising:

a target server for generating server audit information, wherein the target server comprises a database table, the server audit information comprises a transaction log and a trace, the transaction log comprises information representing one or more operations to at least a portion of the database table, and the trace comprises information representing a login event related to the target server;

an information server configured to couple to the server audit information, the information server comprising an audit data module to process the server audit information to create audit data wherein the audit data module is configured to process the server audit information by using the transaction log and the at least a portion of the database table to generate at least one previous state of the at least a portion of the database table,
the audit data comprises:
  the at least one previous state of the at least a portion of the database table; and
  the login event; and an audit data repository coupled to the information server for storing the audit data.

20. The system of claim 19, further comprising:
a job scheduler of the information server to schedule a job for coupling the at least a portion of the transaction log from the target server to the information server.

* * * * *